United States Patent Office 2,827,381
Patented Mar. 18, 1958

2,827,381

STERILE CONCENTRATED MILK

John M. Boyd, Chicago, Ill., assignor to Continental Can Company, Inc., New York, N. Y., a corporation of New York No Drawing. Application December 19, 1952
Serial No. 327,055

2 Claims. (Cl. 99—184)

The following specification deals with an improved sterile, concentrated milk and the process for producing it.

Sterilized milk that has been concentrated offers evident advantages in keeping qualities. It has also an economic advantage in distribution and handling. Furthermore, it is a great convenience to the consumer who is able to reconstitute milk in a form similar to normal milk and equally palatable. There are definite limitations, however, in preservation, excessive viscosity, graininess, darkened color, and loss of natural flavor. Known processes for sterilizing and concentrating milk have limitations in the extent to which the butterfats separate out and the protein is precipitated to form a distinct graininess.

One of the objects of my invention is to prevent the separation of butterfat and the precipitation of non-fat solids, with the total solids at a high concentration ratio. At the same time it is possible to ensure lower viscosity and less change in color.

A further object of the invention is to ensure lower viscosity for the concentrated milk, thus rendering it more acceptable to the trade. In like manner, the process results in a product in which the color has not materially changed, and on reconstitution the product resembles whole milk.

The process may be advantageously combined with steps in which the minerals may be modified or exchanged to produce a better product, with greater physical stability.

An essential feature of the invention is that the raw, fluid whole milk is given a preliminary treatment by which the globules of butterfat are melted or rendered capable of easy rupture.

This preheating thus permits a most effective homogenization. The globules of butterfat are thus broken up by the high pressure homogenizer to produce a uniform fluid most suitable for further treating steps.

Homogenization is followed by sterilization of the fluid milk. This may be done by flash heating, or by the use of a lower temperature at which the milk is held for a limited time.

The sterilized, homogenized milk thus produced may be partially cooled, although it is preferable to run the hot milk directly from the heater into the evaporator.

The milk in the evaporator is subject to vacuum so that rapid concentration can be obtained at a relatively low temperature. It is found that the falling film type of evaporator has advantages for this purpose because of the lower temperature differential required between the fluid and the heating medium.

Finally the concentrated milk is filled in previously sterilized containers, such as metal cans, and immediately sealed under aseptic conditions without requiring any processing after sealing.

The preferred manner of carrying out this process begins with raw, fluid whole milk of the best quality. This milk is de-aerated and heated to a temperature above the melting point of the butterfat. This implies a range of from 120° to 180° Fahrenheit.

As soon as the milk has become thoroughly heated to the selected temperature, it is passed through a high pressure homogenizer. The result is a thoroughly uniform fluid which is still approximately the same temperature as it was when it entered the homogenizer.

The hot milk is then sterilized by being raised to a temperature in a range from 250° to 300° Fahrenheit in a heat exchanger. It is held at this temperature for the time required for sterilization. The holding time varies inversely with the temperature in a logarithmic manner. For example, at 300° F. no holding time is necessary as sterilization is accomplished during the time required to reach this temperature, of approximately 6 seconds in a suitable heat exchanger. At 250° F. the milk has to be held at that temperature for approximately 5 minutes to accomplish similar sterilization.

Sterilization following homogenization is preferable, as it avoids the necessity of maintaining aseptic conditions in the homogenizer.

The milk may be brought down to a warm temperature after sterilization, but it is preferable to run it hot directly to the evaporator.

The evaporator is one which operates under reduced pressure or vacuum, and the temperature is not more than 140° Fahrenheit. The entire apparatus must be maintained sterile. The preferred type of apparatus is that in which the milk is treated in a falling film rather than by a coil-heated vacuum pan or external heated vapor using tube nest evaporation. The evaporation quickly brings the temperature down to the desired operating temperature of 140° Fahrenheit or lower where it is maintained.

The evaporation produces a concentrated milk with the desired degree of viscosity. Then the undesired remaining heat is removed by suitable sterile cooling apparatus. It is then conveyed under aseptic conditions to a filling and closing apparatus which is maintained in sterile condition. The milk is there filled in previously sterilized cans and closed, still in the sterile atmosphere.

Completion of the product as outlined gives a sterile product which does not need further processing.

By following the sequence of steps above outlined, a concentration of 3 or 4 to 1 produces a viscosity no greater than the customary evaporated milk which has a concentration slightly above 2 to 1.

Upon reconstitution by adding water it does not, however, have the thick feel characteristic of evaporated milk. It is free from graininess or darkened color and has no cooked flavor.

While raw, whole milk has been used in the above example, the process is equally applicable to milk which has been modified by the addition of mineral salts or by vitamins or by an ion exchange treatment or by combinations of these treatments.

The improved process is believed to be distinctive in the sequence of steps. Preliminary heating is found to be a definite advantage in improving the homogenization. In like manner the hot, homogenized milk lends itself to sterilization in a way quite superior to sterilization following concentration. It is found that this sterilization, when it follows the homogenizing step, corrects for any lack of aseptic condition during homogenization.

Finally, the sterilization is an excellent preparation for concentration by heat under reduced pressure. The heat necessary to accomplish sterilization is used for a part of the evaporation thus requiring the application of less heat during the evaporation.

The result of this process is a product which is most effectively sterile so that final processing of the packaged material is unnecessary. Also, when the evaporation occurs after sterilization, the resulting product is not unduly colored, there is no cooked flavor, there is an absence of separation of solids and increased stability is found.

Within the essential outline of the process as described, the invention is limited solely by the scope of the appended claims.

What I claim is:

1. The continuous process of concentrating whole milk to from one quarter to one third of its original volume which consists in de-aerating raw whole milk and flash heating to from 120° F. to 180° F. until the butter-fat is melted, homogenizing the heated milk, flash heating the milk by bringing its temperature up to a range within from 250° F. for five minutes or to 300° F. momentarily, evaporating the milk under reduced pressure and under aseptic conditions at less than 140° F., cooling the sterile milk and filling and sealing the concentrated sterile milk under aseptic conditions into sterilized containers without further heat treatment.

2. Concentrated sterile whole milk of from one quarter to one third of its original volume and produced by the method of claim 1.

References Cited in the file of this patent

UNITED STATES PATENTS

| | | |
|---|---|---|
| 2,553,783 | Park | May 22, 1951 |
| 2,604,403 | Wiechers | July 22, 1952 |

OTHER REFERENCES

"Condensed Milk and Milk Powder" text by O. F. Hunziker, 6th edition, published by the author La Grange, Illinois, pages 192, 193, 197, 198, 144 and 145.